(12) United States Patent
Kuykendall, Jr.

(10) Patent No.: US 7,436,568 B1
(45) Date of Patent: Oct. 14, 2008

(54) HEAD MOUNTABLE VIDEO DISPLAY

(76) Inventor: Jacob L. Kuykendall, Jr., 25 Hampshire St., Sudbury, MA (US) 01776

( * ) Notice: Subject to any disclaimer, the term of this patent is extended or adjusted under 35 U.S.C. 154(b) by 0 days.

(21) Appl. No.: 11/161,813

(22) Filed: Aug. 17, 2005

Related U.S. Application Data

(60) Provisional application No. 60/642,578, filed on Jan. 11, 2005, provisional application No. 60/619,472, filed on Oct. 18, 2004, provisional application No. 60/606,717, filed on Sep. 2, 2004, provisional application No. 60/602,002, filed on Aug. 17, 2004.

(51) Int. Cl.
*G02F 1/03* (2006.01)
(52) U.S. Cl. .................... 359/245; 359/630
(58) Field of Classification Search .......... 359/245, 359/290, 291, 292, 298, 630, 631; 600/558; 351/209, 210; 345/4, 5, 7, 8, 9, 89, 83, 530
See application file for complete search history.

(56) References Cited

U.S. PATENT DOCUMENTS 6,407,833 B2 * 6/2002 Klug et al. .................... 359/32
7,222,974 B2 * 5/2007 Tomita ......................... 353/94

* cited by examiner

*Primary Examiner*—Hung X. Dang
*Assistant Examiner*—Tuyen Q Tra
(74) *Attorney, Agent, or Firm*—Daniel S. Coolidge

(57) ABSTRACT

The invention comprises a distributed direct retinal display projection system that can be fabricated as an embedded, integral part of an eyeglasses frame and can be configured to address a wide range of commercial, consumer and military applications. A system is described comprising a video processing module that may worn on a belt or carried in a pocket, which transmits an image through a multi-waveform optical cable that is configured with a wave guide per pixel.

21 Claims, 5 Drawing Sheets

Front View

Side View

Top View

HEAD MOUNTABLE VIDEO DISPLAY

This application claims the benefit of priority from previously filed U.S. Provisional Patent Applications Nos. 60/602,002, filed Aug. 17, 2004, 60/606,717, filed Sep. 2, 2004, 60/619,472 filed Oct. 18, 2004 60/642,578 filed Jan. 11, 2005, each of which is incorporated herein by reference.

FIELD OF INVENTION

The invention relates generally to direct retinal image projection, and more particularly to 3-D head mounted display systems.

BACKGROUND OF THE INVENTION

Direct retinal projection systems have been in existence over the past decade and have been applied primarily to niche applications. There has not been wide application or demand at the consumer level, however, due to low resolution, high cost and the inability of current designs to be shrunk to a size that can be conveniently and comfortably worn by a user.

In the military environment, it was recognized that in today's high speed and complex aircraft that it was dangerous for a pilot to have to look down at an instrument panel. Accordingly, a means was developed to present an image of desired information (heading, airspeed, altitude etc.) in a heads up display (HUD) that allowed the pilot to see both the information presented and to look out the aircraft window. For broader applications, the HUD has proven to be expensive and generally low resolution. It would be desirable in many instances to have a similar presentation of information or imagery, in a relatively inexpensive unit that was lightweight, capable of being worn on the head, and allowing for display of imagery as well as allowing a user to see in what is actually in front of him or her. Applications of such a device would be myriad: as a computer terminal display or virtual reality systems, combining infrared imagery to visual light displays so as to see thermal patterns in an object and full color stereoscopic night vision systems, Ideally, such a display system would be lightweight and comfortable, yet capable of providing high resolution imagery greater than or equal to HDTV. What is needed is a means of taking a video signal and processing it so as to provide the imagery to a device generally of the size of ordinary eyeglasses. It would also be desirable to be able to produce stereoscopic imagery, and to be able to combine two or more images sources in the same display.

BRIEF SUMMARY OF THE INVENTION

This invention disclosure describes an improved head mounted display that provides a true replica of a high resolution image or video stream that is captured live via integrated stereo cameras or from archival video sources. The basic design of this invention will serve as a generic human/computer input-output device that can serve numerous applications that are now addressed with special purpose systems. The direct retinal projection 3-D display system described herein represents an advanced display solution that can be can be fabricated as an embedded, integral part of the glasses frame and can be configured to address and satisfy a wide range of commercial and military applications. A representative list of applications include; a replacement and alternative to conventional TV sets, replacement for desktop computer CRTs and LCD monitors and for laptop LCD monitors, and a replacement for legacy military and consumer head mounted displays. Special purpose applications that can be added to this basic configuration are covered in above noted provisional patent filings will include man-machine interfaces for controlling external devices with eye movement such as wheel chairs, remotely controlled land and air vehicles, tracking and pinpointing targets. With enhancements to the basic eyeglasses frame platform, such as adding infra red probes to the eyeglasses lenses with holographic couplers built into the lenses and image capture sensors in the image processing unit, certain ocular parameters can be dynamically monitored to provide the biological measurements to predict performance failure due to fatigue, and as supplements and enhancements to lie detector test devices. Other enhancements covered in provisional patent applications include the addition of stereo cameras with zoom lens capabilities. Capabilities that will be added through software enhancements include integrated face recognition capabilities, geographic information that can be fused onto viewed images real-time images, real-time viewing of images that are captured in multi-spectral windows and in fusing the images.

This invention strives to provide a realistic stereo 3-D view through an optical/electronic head mounted system that closely approximates the natural stereo vision that one would observe if seen through the naked eyes. (If the image is viewed with one eye only, or if the same image is projected to both eyes, a 2-D view will be observed.) This is accomplished by recording images using dual stereo video cameras that have approximately the same spacing between the lenses (approximately 6 cm) as between the human eyes. By projecting the dual images that are captured from the stereo cameras directly onto the retinas, the viewer need not focus on a display screen as is the case for current art systems, but focuses at a point near infinity, thus avoiding the problems of eye strain commonly encountered with legacy methodologies that are delivered through a CRT or LCD monitor. Conversely, if stereo 3-D is delivered by way of a CRT of LCD screen, the user becomes stressed as the result of having two possible points of focus, the face of the projection screen or at some point behind the screen that is the focal point of the projected image, giving rise to eyestrain, disorientation and confusion.

The eyeglasses frame based direct retinal projection methodology of this invention is located on the silvered upper portion of the lens that serves as a reflecting surface only, thus there is no eyepiece lens involved. The images delivered to the retinas are the same images that the lens camera sees, and this system provides a view similar to that seen through a stereo viewfinder of the stereo cameras, that will result in 3-D stereo and of high resolution consistent with the resolution offered by the electro/optic modulator. For current art Liquid Crystal on Silicon (LCOS) modulators, the resolution is 2048×1536, far exceeding current HVTD standards. In delivering the images by utilizing the upper portion of the eyeglasses lenses, a technique is used similar to that of normal bi-focal eyeglasses but reversed, where the projected images from the video processing sub-system are directed to the top of the lenses (reflecting onto each retina) and the normal vision (prescription or non-prescription) is seen through the bottom portion of the lenses.

This invention is for an improved direct retinal projection system that incorporates highly efficient, long life, high brightness light emitting diodes (LEDs) as the red-green-blue (RGB) light sources. High resolution modulation technology such as Liquid Crystal on Silicon (LCOS) is used to generate high definition stereo video capabilities within a small form factor. Current resolution for the LCOS technology is 2048× 1536 pixels from a chip measuring 1.3" in diameter, and as this technological advance, the resolution will increases while the chip size will decrease. With the flexible design of the present invention, these advancements can be accommodated resulting in shrinking the size of the video processing unit. It should be noted that even with current art LCOS technology; this invention will provide resolution that far exceeds that of industry standard HDTV sets.

The eye glasses frame embedded direct retinal projection subsystem is optically connected through a multi-waveform optical cable that has a density of one wave guide per pixel enabling the head worn portion of the system to be completely passive. With the design concept and fabrication methodology of this invention, the eyeglass frame portion of the system resembles a set of designer sunglasses and the remote video processing module, worn on a belt or carried in a pocket or other locations on the body, is a device approximately the shape of a current technology cell phone (2005) but of greater thickness. The power delivered directly to the retina with this system is in the range of one half to two miliwatts, (compared to a large screen TV that consumes several thousand times the power of this device). When these systems are widely deployed and replaces legacy TV sets and computer monitors, this invention will have a major impact on a nation's power consumption.

Among the objectives of this invention is to provide a more efficient and cost effective means of delivering visual information to a viewer from a TV receiving unit or from a computer that will be an alternative to TV cathode ray tube screens or solid state devices such as liquid crystal displays and plasma displays. Current technology direct retinal projection systems typically require that the processing of the video images take place on the head, utilizing all of the electronics, optics and power of the system. The present invention uses a distributed architecture, whereby the electrical and optical processing is done in a belt worn or pocket or other places on the body, and the head mounted optical elements are all passive, interconnected via a dense multi-wave guide optical cable.

The eyeglasses frame embedded approach that is the basis for the present invention delivers high resolution color images to both eyes by reflections from the eye glasses lenses, an approach that is similar to bi-focal spectacles, but by projecting images onto the retina via silvered surfaces of the upper portion of the lenses while keeping normal vision through the lower portion of the lenses, a reverse from the normal reading/ far vision glasses. The red, green, blue light that is delivered to the retina may be supplied by long life light emitting diodes, that are gated on a 33.3 percent duty cycle each, allowing the eyes to integrate the light to form integrated color.

The un-modulated light beams from the LED sources are polarized and divided into two beams through a polarized/ beam splitter optical element which is fabricated using a single truncated cube, to direct the two beams to dual multi-wave guide optical cables that carry the images to each of the retinas through the eyeglasses integrated direct retinal projection subsystem. The truncated cube also encompasses two electro/optical modulators, one for each eye that facilitates modulating each RGB beam independently of one another, enabling images that are captured via stereo video cameras to be processed and delivered to each of the eyes. This capability provided high resolution, full color 3-D stereo with extremely high quality.

Streaming video images from TV receivers, stereo video cameras and/or computers are directed to the two modulators, where the video images from the TV and/or computer sources are used to modulate the RGB source beams. Modulated images are then directed to a dense, high resolution multi-wave guide polymer optical cable that contains one wave guide per pixel. The wave guide carries the images to the glasses frame, where the images are directed to the retina, via a miniature periscope arrangement that projects video images through free space to each retina. The upper portions of the lenses are silvered, and are used as the last stage of the optical link to expand the images to provide a wide field of view. The lower portion of the lenses may be prescription or non-prescription, depending on the needs of the viewer.

Stereo images sources that drive the electro/optical modulators can originate from legacy TV receivers, from stereo video cameras that could be head mounted or from computers via standard wireless protocols such as WiFi, WiMax, Firewire or any of the standard protocols. Alternatively, the processing units will contain integrated high level chip sets that capture and/or originate the modulation signals including cameras-on-a-chip, computers-on-a-chip and TV receivers-on-a-chip. As I-Pod type technology advances, it can be anticipated that HDTV compatible I-Pod type products will enter the market to serve as audio/video sources for this invention.

The accompanying audio signals that are generated by TV soundtracks may be captured and delivered to the eyeglasses frame electronically, and fed to two miniature earphones utilizing legacy technology.

BRIEF DESCRIPTION OF THE DRAWINGS

The invention is pointed out with particularity in the claims forming the concluding portion of the specification. The invention, both as to its organization and manner of operation, may be further understood by reference to the following description taken in connection with the following drawings:

DETAILED DESCRIPTION

Figure 1:
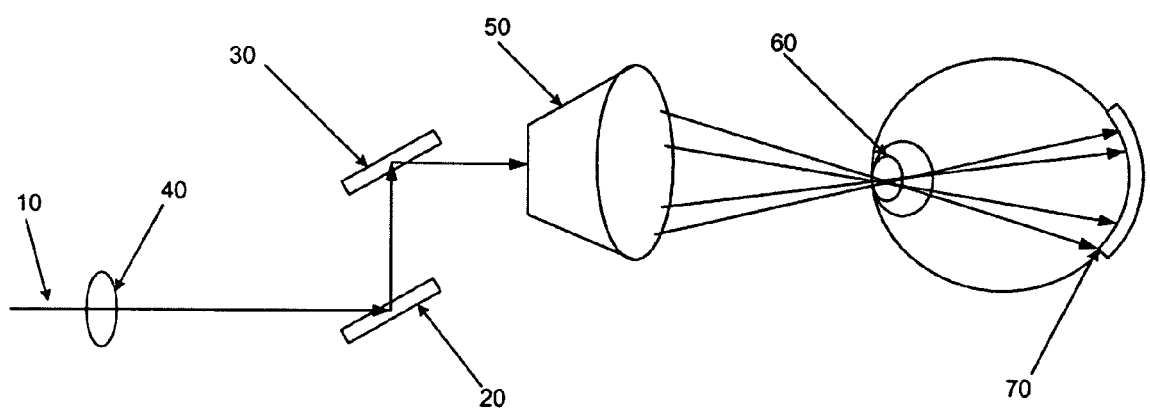
FIG. 1 is a schematic illustration of prior art scanning display system.

Referring to FIG. 1, a pictorial and block diagram is shown of a typical, prior art system that utilized a modulated low-power photon source 1 that is controllable both horizontally 3 and vertically 4. The modulated photon source is focused through an achromatic focusing lens 2 before it reaches the horizontal scanning mirror 3. With this approach, the process that controls the signal that paints the images onto the retina 7 is similar to that of a classic TV CRT, but the process uses photons and not electrons. The light beam's final pass bounces off a small reflecting surface 5 before entering the lens of the eye 6 and imaging onto the retina 7. To obtain color with this approach, three separate lasers are used, each with the desired red, green, blue wavelengths. Variations to this legacy approach are to utilize a miniature, low resolution CRT or liquid crystal display panel that is mounted in front of one or both of the eyes. As the size of the display with this methodology is limited, the number of pixels that can be accommodates is small and resolution is extremely low.

Figure 2:
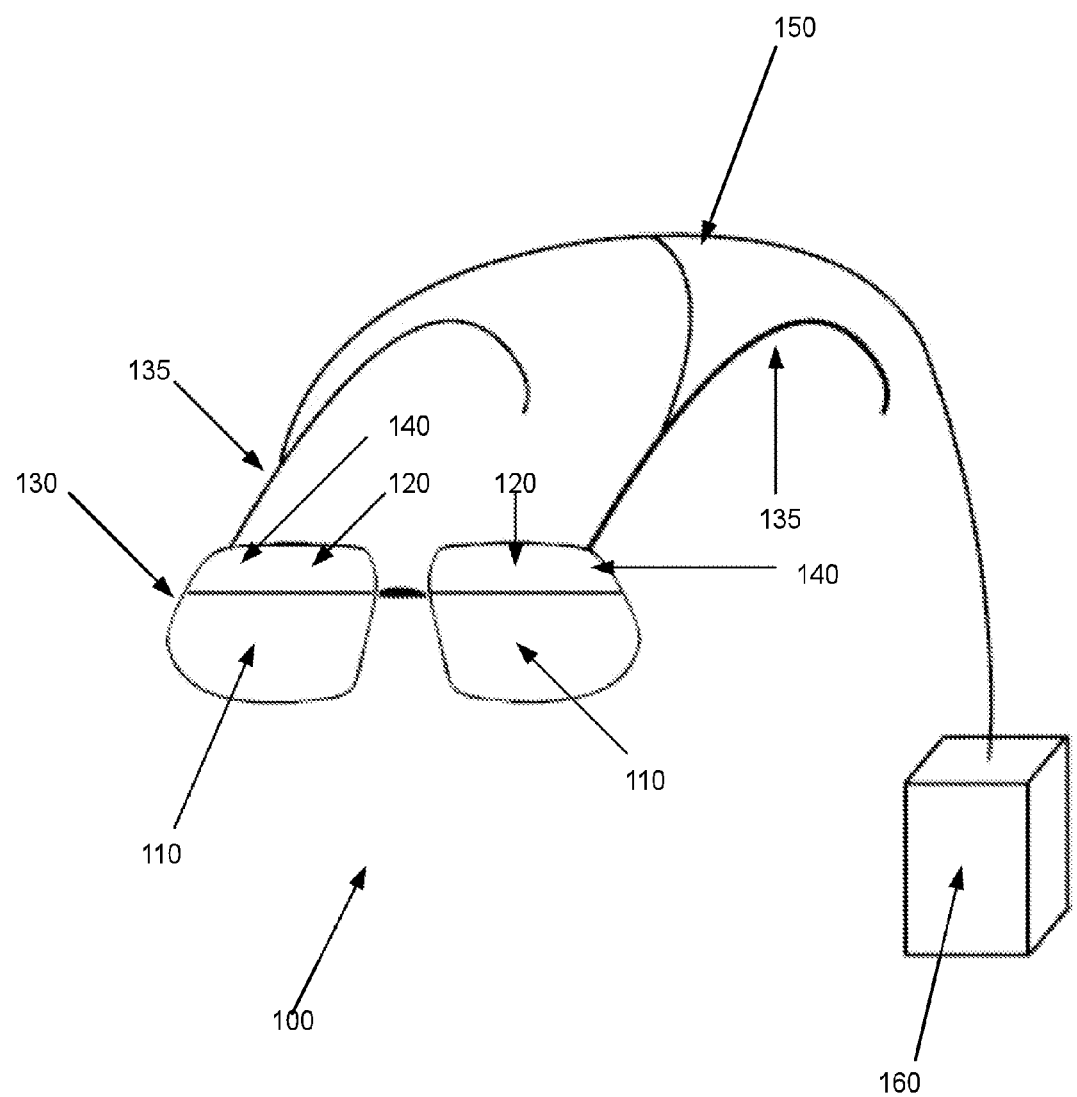
FIG. 2 is a stylized illustration of a distributed direct retinal display system.

FIG. 2 is a stylized illustration of a distributed directly retinal projection system 100 in accordance with the principles of the invention. The eyeglasses frame direct retinal projection system 100 appears as a conventional set of glasses 130 and contains conventional lenses 110 that may be prescription or non-prescription. The lenses 110 have a silvered upper portion 120 that serves as a reflecting surface to direct images to each retina. The earpieces 135 of the glasses frame 130 house a dense optical multi-wave guide array 150, the embedded dense optical multi wave guide array being connected to the exit pupil expander 140 that optically expands the images through a free space segment that bounces the beam off the upper portion of the silvered glasses lenses 120. From these silvered lens reflective surfaces 120, the images are directed to each retina.

The lower portions of the lenses afford normal vision, in the manner of a reversed bi-focal set of spectacles. The optical connection between the multi wave guide array 150 and the eyeglasses frame projection system 100 is via a free space connection within the horizontal portion of the top, front of the glasses frame above the lenses 110, just before the exit pupil expander mirror system 140, shown in detail below.

The multi-wave guide array optical cable 150 connects to an electronics module 160. The video source (not shown) connects to the electronics module 160 which may be belt worn or carried in a pocket. The electronics module 160 is the processing unit and optical driver for the eyeglasses frame direct retinal projection system 100. The video source and electronics module 160 may be RF linked or hard wired to external video sources, such as live or archival TV programming or to legacy computer systems, to serve as the primary or secondary input-output device for computers of all configurations using industry standard networking protocols.

Figure 3:
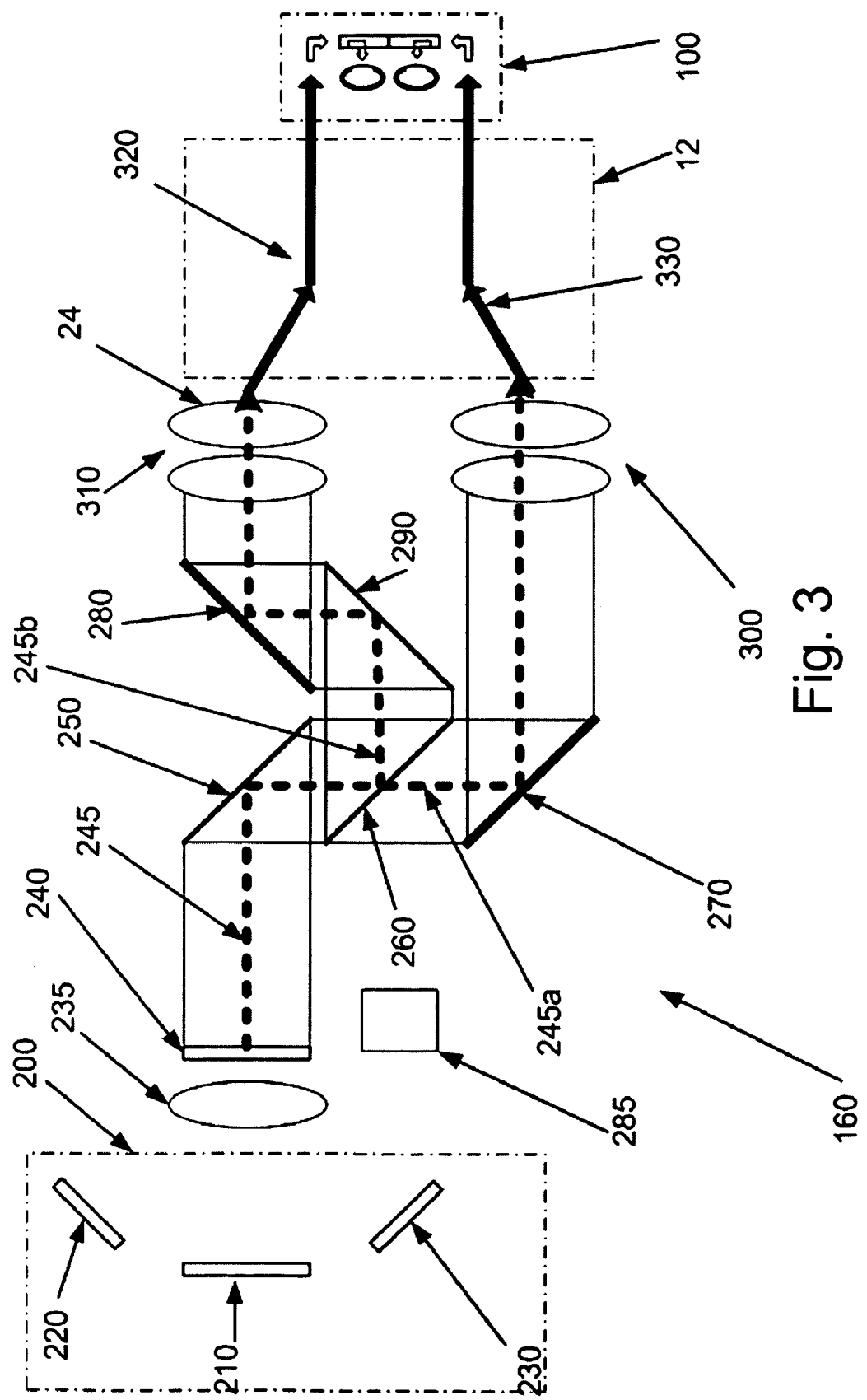
FIG. 3 is a schematic illustration of the video processing unit.

FIG. 3 is a block diagram illustration of the video source and electronics module 160. The electronics module 160 module contains a light source 200 which may be a single source or may, for color applications, contain multiple light sources (such as red, green and blue) 210, 220 and 230. A collimating lens 235 directs the light to a holographic beam combiner 240 into a single beam 245.

A single three color element LED system would also work, which would eliminate the need for the holographic beam combiner 240, but would add some complexity in generating collimated beams, however either approach will work. In the concept is to utilize a ⅓ duty cycle on each of the three light sources, accomplishing the same results as if using legacy color wheels, but with no moving parts.

The light beam 245 is directed onto a reflective polarizer 250, that polarizes the light and reflects it to a beam splitter 260. (A transmissive polarizer could be used here with a different path configuration.) A portion of the beam 245 is transmitted by the beam splitter 260 as beam 245*a*, and a portion reflected by the beam splitter 260 as beam 245*b*. (If stereo imagery is not required, then the beam splitter and second beam 245*b* are not required.)

Beam 245*a* is directed onto a reflective electro-optical modulator 270 such as a liquid crystal on silicon (LCOS) device. Beam 245*b* (in stereo applications) is reflected by a reflector 290 onto a second electro-optical modulator 280.

The modulation control signals come from a stereo or mono video source 285, which could be any one of a number of standard input devices, including an internal TV receiving system that is a TV-on-a-chip, an external TV set, a computer system or a live video camera. An industry standard RF connection linking the modulating source device to external computer of TV sources could also be used. If the modulation signals have their origination from a stereo video camera, the vision presented to the viewer will be a stereo 3-D streaming video. Cameras could be mounted on the eyeglasses portion 130 of the retinal projection system 100 so as to provide various real-time imagery to the video source 285, such as infrared.

In a stereo application, the video signal is time division multiplexed so as to provide an image alternately to optical cable 320 and 330. In color applications, the video signal must be further time division multiplexed to sequentially image using each of the light different colored light sources.

The multi wave guide array optical cables 320 and 330 can interface to the focusing lens systems 310 and 300 respectively, via a pixel by pixel tapering technique, thus allowing the output of the modulators 270 and 280 to match the pixel arrangement of the fiber cable. One or both of the multi waveguide optical cables are connected to the retinal projection system 100 as shown in FIG. 2.

Figure 4:
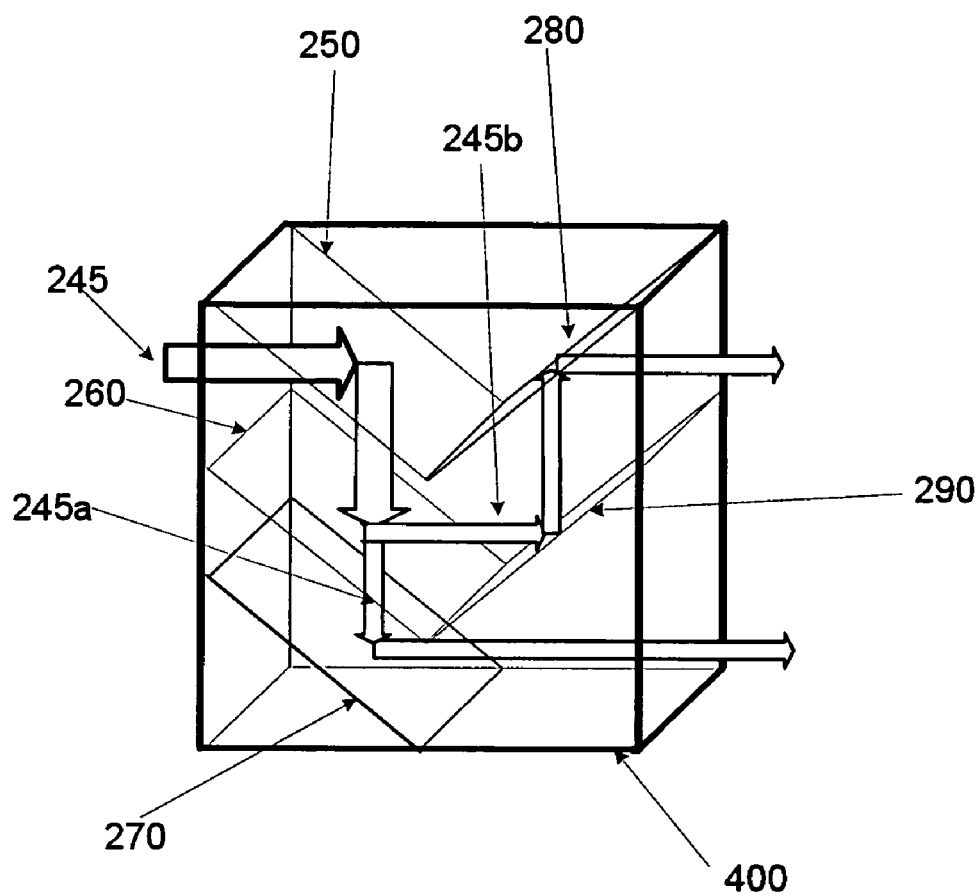
FIG. 4 is a schematic illustration of a truncated beam splitting cube.

FIG. 4 is a block diagram illustration of a truncated V cube stereo optical signal processor 400 containing right eye/left eye modulation and optical beam splitting. A single modulator/polarizer/beam splitter is used to display three colors, by sequencing each color on a ⅓ duty cycle and allowing the human eye to integrate the colors to produce the correct composite mix of colors. This is accomplished by filtering and separating the color of the modulating video images signals so they also modulate the three colors at a ⅓ duty cycle that are synchronized with the light sources.

The truncated V cube stereo optical signal processor 400 may be constructed from a single polymer cube that has a V notch in the top and one facet removed from the lower portion of the input side of the cube that is parallel to the V notch at the input side of the cube. A full mirror/polarizer 250 is located on the input side of the top of the block and the left eye electro optical modulator 270 is located on the parallel facet at the bottom of the block. The remaining V facet on the output side of the block houses the right eye electro optical modulator 280. Embedded within the body of the block, between the polarizer 250 and the left eye modulator 270 is beam splitter 260 which may be implemented in a half mirror facet that directs ½ of the beam 245 to a second full mirror 290 which in turn directs the right eye beam to the right eye electro optical modulator 280.

Figure 5A:
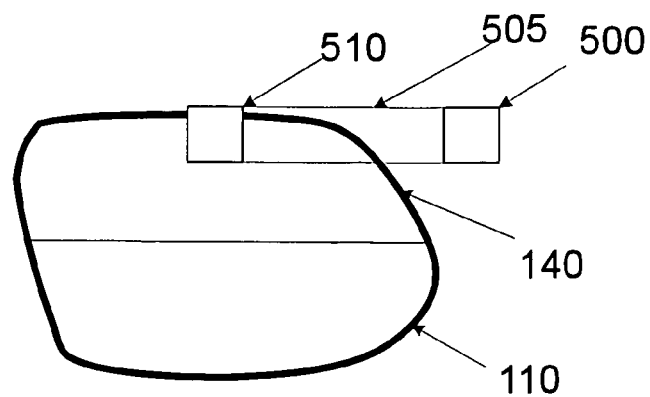
FIG. 5 is a schematic illustration of the eyeglasses frame and exit pupil expander.
Figure 5B:
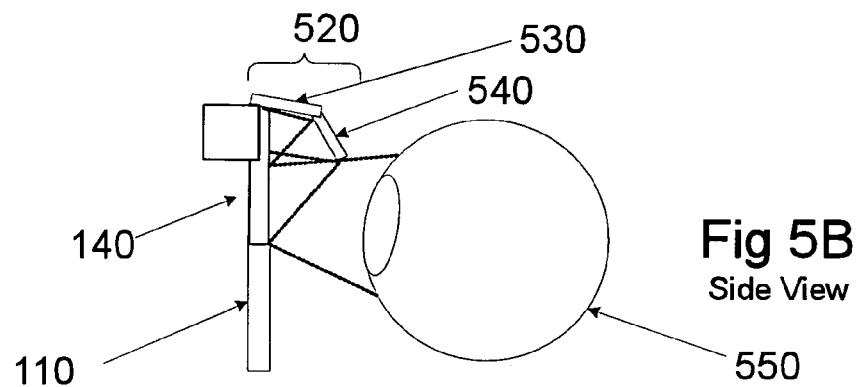
Figure 5C:
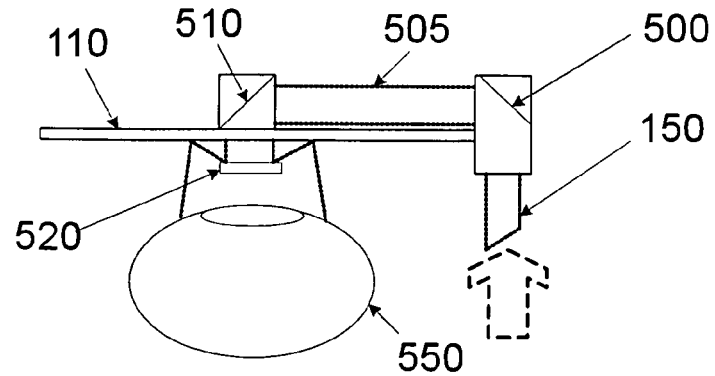

FIGS. 5*a*, 5*b* and 5*c* show respectively the front, side and top view of the exit pupil expander 140 portion of the direct retinal projection display system 100, showing how wide field of view is accomplished. For clarity, the glasses frame 130 is not shown in these illustrations, rather just the optical multi wave guide array optical cables 150 and a single eyeglasses lens 110 and silvered portion 140. The video images are sent from the video source and electronics module 160 to the eyeglasses frame direct retinal projection system 100 via the multi wave guide array optical cable 150. The images are directed through a open space section 505 within the eyeglasses frame that comprises a pair of ninety degree mirrors 500 and 510 that direct the images to the exit pupil expander 520. The exit pupil expander 520 is mounted on the front and center of the eyeglasses lenses 110 and is an integral part of the front upper portion of the eyeglass frame 130. Through a set of mirrors 530 and 540 within the exit pupil expander 520, the image is directed to an area just above the center of the eye 550, and back to the upper silvered portion of the lens where it is expanded by way of a small curvature of the mirror 540 and a corresponding slight curvature of the eyeglass lenses, optimized to achieve the desired field of view. For production units, field adjustments could be made to this combination of mirror and lens to satisfy individual viewing requirements.

What is claimed is:

1. An image processing system comprising:
at least one light source;
a collimator placed so as to receive and collimate light from said light source;
an optical polarizer placed so as to receive and polarize light from the said collimator thereby operable for producing a first polarized light beam;
a video signal source;
at least one multi-pixel electro-optical modulator placed so as to receive said first polarized light beam, and operable for modulating said first polarized light beam responsively to said video signal and producing a first modulated light beam;
at least one focusing lens placed so as to receive and focus said modulated light beam from said at least one electro-optical modulator further comprising a beam splitter interposed between said polarizer and said at least one electro optical modulator so as to pass a portion of said polarized beam and reflect a portion of said polarized beam, the reflected polarized beam making a second polarized beam; and further comprising a reflector to reflect said second polarized beam onto a second electro-optical modulator, and wherein said second optical modulator is connected to said video signal source and is responsive thereto and thereby operable for producing a second modulated beam; further comprising a second focusing lens placed so as to receive and focus said second modulated beam.

2. The system of claim 1 wherein the video signal is multiplexed so as to provide a video signal alternately to said at least one electro-optical modulator and said second electro-optical modulator, thereby able to produce a separate image by each of said electro-optical modulators.

3. The system of claim 2 wherein the video source comprises at least two images comprising a single stereoscopic image.

4. The system of claim 1 further comprising at least one first multi optical waveguide having a first end and a second end, and wherein said first end is placed so as to receive the said focused beam from said at least one focusing lens.

5. The system of claim 4 wherein there is a separate waveguide for each pixel of said modulator.

6. The system of claim 4 wherein said at least one multi-optical waveguide is connected to a head mountable frame, said frame having at least one directing mirror and said second end of said multi-optical waveguide positioned so as to direct said focused beam onto said at least one directing mirror; and wherein said at least one directing mirror is placed so as to reflect said focused image into a pupil expander.

7. The system of claim 4 wherein said head-mountable frame comprises an eyeglasses frame; and further wherein said eyeglasses frame comprises at least one lens having a lower planar surface and an upper planar surface, wherein said upper planar surface is reflective; further wherein said pupil expander is positioned at a top of said eyeglasses frame so as to direct said focused image onto said reflective upper planar surface.

8. The system of claim 1 wherein said polarizer, beam splitter, reflector, first and second electro-modulators are all mounted in a monolithic truncated V block.

9. A method of producing an image comprising:
providing a light source;
providing a collimator positioned so as to receive light from said light source and thereby producing a collimated light beam;
providing a polarizer and directing said collimated beam onto said polarizer thereby producing a polarized light beam;
providing a multi-pixel electro-optical modulator and directing said polarized light beam onto said modulator;
providing a video signal source to said modulator which is responsive to said video signal thereby producing a modulated light beam;
providing a focusing lens and directing said modulated light beam into said focusing lens thereby producing an image;
further comprising providing a beam splitter interposed between said polarizer and said at least one electro optical modulator so as to pass a portion of said polarized beam and reflect a portion of said polarized beam, the reflected polarized beam making a second polarized beam; and further providing a reflector to reflect said second polarized beam onto a second electro-optical modulator, and wherein said second optical modulator is connected to said video signal source and is responsive thereto thereby producing a second modulated beam;
further providing a second focusing lens placed so as to receive and focus said second modulated beam.

10. The method of claim 9 further multiplexing said video signal so as to provide a video signal alternately to said at least one electro-optical modulator and said second electro-optical modulator, thereby producing a separate image by each of said electro-optical modulators.

11. The method of claim 10 wherein the video source provides at least two images together comprising a single stereoscopic image.

12. The method of claim 9 further providing at least one first multi optical waveguide having a first end and a second end, and mounting said first end of said multi-optical waveguide so as to receive the said focused beam from said at least one focusing lens.

13. The method of claim 12 wherein said multi-optical waveguide comprises a separate waveguide for each pixel of said modulator.

14. The method of claim 12 further connecting said at least one multi-optical waveguide to a head-mountable frame, providing at least one directing mirror and mounting said second end of said multi-optical waveguide so as to direct said focused beam onto said at least one directing mirror; and further providing a pupil expander, and further placing said at least one directing mirror so as to reflect said focused image into a pupil expander.

15. The method of claim 14 wherein said head-mountable frame comprises an eyeglasses frame; and further providing said eyeglasses frame with at least one lens, said at least one lens having a lower planar surface and an upper planar surface, wherein said upper planar surface is reflective; further positioning said pupil expander at a top of said eyeglasses frame so as to direct said focused image onto said reflective upper planar surface.

16. The method of claim 9 further mounting said polarizer, beam splitter, reflector, first and second electro-modulators in a monolithic truncated V block.

17. A distributed image processing system comprising:
at least one light source;
a collimator placed so as to receive and collimate light from said light source;

an optical polarizer placed so as to receive and polarize light from the said collimator thereby operable for producing a first polarized light beam;

a video signal source;

at least one multi-pixel electro-optical modulator placed so as to receive said first polarized light beam, and operable for modulating said first polarized light beam responsively to said video signal and producing a first modulated light beam;

at least one focusing lens placed so as to receive and focus said modulated light beam from said at least one electro-optical modulator;

at least one multi-optical waveguide having a first end and a second end, wherein said first end is placed so as to receive said focused beam from said at least one focusing lens, further comprising a head mounted frame comprising at least one lens comprising a lower planar surface and an upper planar surface, wherein said upper planar surface is reflective positioned so as to be in front of a user's eye when worn, and wherein said at least one multi-optical waveguide is connected to said head mounted frame at said second end, said frame having at least one directing mirror and said second end of said multi-optical waveguide positioned so as to direct said focused beam onto said at least one directing mirror; and further comprising a pupil expander, wherein said at least one directing mirror is placed so as to reflect said focused image into said pupil expander and thence onto said reflecting surface of said at least one lens.

18. A system for a head mounted display comprising at least one multi-optical waveguide having a first end and a second end, and wherein said first end is placed so as to receive thereon a focused pixilated optical image, said multi-optical waveguide having a separate waveguide for each pixel in said pixilated optical image; wherein said second end of said at least one multi-optical waveguide is connected to a head mountable frame, said frame having at least one directing mirror; and wherein said second end of said multi-optical waveguide is positioned so as to direct said focused pixilated optical image onto said at least one directing mirror; further comprising a pupil expander and wherein said at least one directing mirror is placed so as to reflect said focused image into said pupil expander.

19. The system of claim 18 wherein said head-mountable frame comprises an eyeglasses frame having a top side; and further wherein said eyeglasses frame comprises at least one lens having a lower planar surface and an upper planar surface, wherein said upper planar surface is reflective; further wherein said pupil expander is positioned at a top of said eyeglasses frame so as to direct said focused image onto said reflective upper planar surface.

20. A method for displaying a pixilated image on a head mountable display comprising
providing a focused pixilated optical beam;
further providing at least one multi-optical waveguide having a first end and a second end, said multi-optical waveguide having a separate waveguide for each pixel of said focused pixilated optical beam;
directing said focused pixilated optical beam at said first end of said multi-optical waveguide so as to receive the said focused pixilated beam into said multi-optical waveguide;
connecting said second end of said at least one multi-optical waveguide to a head-mountable frame;
further providing a pupil expander affixed to said head mountable frame;
providing at least one directing mirror affixed to said head mountable frame and mounting said second end of said multi-optical waveguide so as to direct said focused pixilated optical beam onto said at least one directing mirror;
and further placing said at least one directing mirror so as to reflect said focused image into said pupil expander.

21. The method of claim 20 wherein said head-mountable frame comprises an eyeglasses frame having a top side;
and further providing said eyeglasses frame with at least one lens, said at least one lens having a lower planar surface and an upper planar surface, wherein said upper planar surface is reflective;
further positioning said pupil expander at said top of said eyeglasses frame so as to direct said focused pixilated optical image from said second end of said at least one multi-optical waveguide onto said reflective upper planar surface.

* * * * *